W. E. TURNER.
V-NOTCH LIQUID METER.
APPLICATION FILED FEB. 27, 1920.

1,414,385.                                     Patented May 2, 1922.

INVENTOR.
Walter E. Turner,
BY Howard S. Smith,
his ATTORNEY.

UNITED STATES PATENT OFFICE.

WALTER E. TURNER, OF PIQUA, OHIO.

V-NOTCH LIQUID METER.

1,414,385.   Specification of Letters Patent.   Patented May 2, 1922.

Application filed February 27, 1920. Serial No. 361,727.

*To all whom it may concern:*

Be it known that I, WALTER E. TURNER, a citizen of the United States, residing at Piqua, in the county of Miami and State of Ohio, have invented certain new and useful Improvements in V-Notch Liquid Meters, of which the following is a specification.

The principal object of my invention is to provide a V-notch liquid meter which gives a record of the weight of the liquid measured instead of its volume. The device is accordingly very simple in construction, easy of operation, and extremely accurate in the results obtained. It will accurately weigh liquids for all purposes, and because of its extreme simplicity, may be manufactured at relatively small cost.

Other important and incidental objects will be brought out in the following specification and particularly set forth in the subjoined claims.

Figure 1:
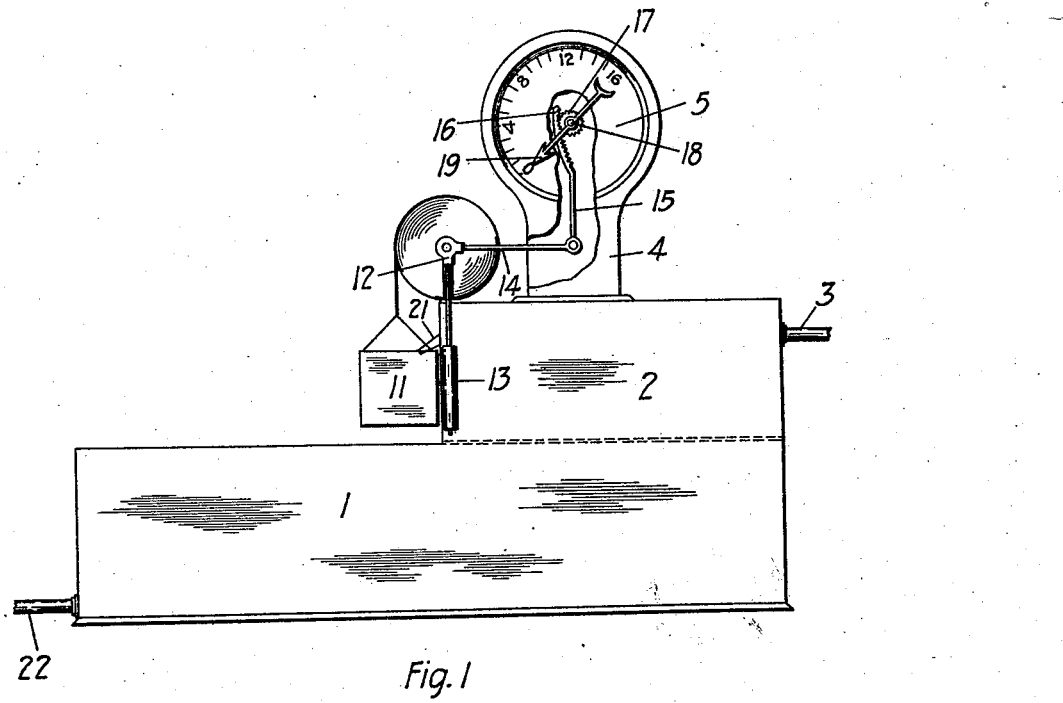
Figure 2:
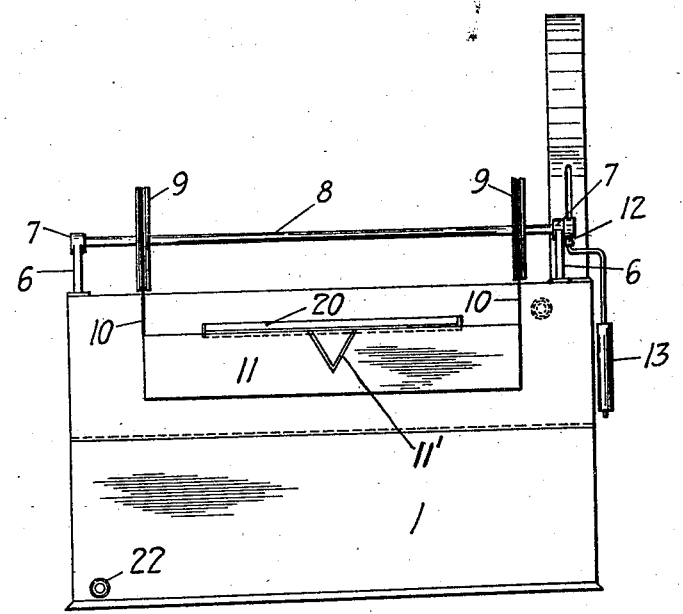

One form of embodiment of my invention is illustrated in the accompanying drawings, of which Figure 1 is a side elevational view of my improved V-notch meter, and Figure 2 is a front view of the same.

Throughout the specification and drawings, similar reference characters denote corresponding parts.

Referring to the accompanying drawings, the numeral 1 designates a liquid container or storage tank that is preferably elongated in shape. Mounted upon one end of the tank 1 is a receiving tank 2 to which liquid is admitted through an inlet tube 3.

Mounted upon the top of the receiving tank 2 is a standard 4 which supports at its upper end an indicating dial 5. In front of the standard 4, at each end of the top of the receiving tank 2, there is secured a bracket 6 in whose upper end there is provided a bearing 7 for a transverse shaft 8. Fast on the shaft 8, preferably between the brackets 6, 6, is a pair of pulleys 9, 9. Passing around each pulley 9 is a flexible element 10, one end of which is made fast to the pulley while from the other ends of the flexible elements 10 a weir box 11 having a V-notch 11' of the usual type is suspended.

Fast on the end of the shaft 8 near the standard 4, is a bell crank 12, to the vertical arm of which is secured a weight 13 that hangs downwardly. Secured to the horizontal arm of the bell crank 12 is a horizontal rod 14 from the outer end of which there projects upwardly a vertical portion 15 of spring material, that terminates at its upper end in a curved rack 16 under sufficient tension to be kept in mesh with a pinion 17 on an indicator shaft 18 on which a pointer 19 that traverses the dial 5, is fast. (See Figure 1).

For the purpose of admitting liquid from the receiving tank 2 to the weir box 11, there is provided in the front portion of that tank, above the normal position of the weir box, a longitudinal slot 20 through which the liquid flows onto an apron 21 that conducts it to the weir box.

The operation of the device is as follows. When no liquid is flowing over the weir box 11, the pendulum weight 13 hangs in a perpendicular position, with the indicator pointer at zero. When the liquid begins to flow over the weir box, the head of the liquid rises in proportion to the rate of flow. The head of the liquid rising in the weir, increases the weight thereof; and in proportion as this weight increases, the pendulum weight 13 will be swung outwardly to move the indicator 19 clockwise through the bell crank 12, horizontal arm 14, rack 15 and pinion 17. The weight of the liquid in the weir box will at all times be in proportion to the rate of flow; and as the latter increases, the head or the weight of the liquid increases, which weight will be accurately indicated by the means described. Any suitable means may be employed for registering this weight.

The liquid which has been thus weighed, falls into the storage tank 1 from which it may be drawn off continuously or at intervals through the outlet 22.

I do not wish to be limited to the details of construction and arrangement herein shown and described, and any changes or modifications may be made therein within the scope of the subjoined claims.

Having described my invention, I claim:

1. In a device of the type described, the combination with a weir box having V-notch, of means for delivering a liquid to be weighed to said weir box, a liquid container, a rotatable member mounted above said weir box, and flexible means adapted to be wound around said rotatable member for suspending said weir box above the liquid container, and for turning said rotatable member when the weight of the liquid in the weir box causes the latter to descend against the resistance of the rotatable member.

2. In a device of the type described, the combination with a weir box having V-notch, of means for delivering a liquid to be weighed to said weir box, a liquid container, a rotatable shaft mounted above said weir box, a pair of pulleys fast on said shaft, a cable fast on each pulley for suspending said weir box above the liquid container, a bell-crank on said shaft, a weight secured to one arm of said bell crank, and a weight-determining device, actuating member operated by the other arm of said bell crank for the purpose specified.

In testimony whereof I have hereunto set my hand this 23rd day of February, 1920.

WALTER E. TURNER.

Witness:

HOWARD S. SMITH.